(12) United States Patent
Leichter

(10) Patent No.: US 8,135,625 B2
(45) Date of Patent: Mar. 13, 2012

(54) ELECTRONIC DATA PROCESSING SYSTEM FOR INTERNET AUCTIONS

(75) Inventor: Erwin Leichter, Oldenburg (DE)

(73) Assignee: acinum AG, Herisau/AR (CH)

( * ) Notice: Subject to any disclaimer, the term of this patent is extended or adjusted under 35 U.S.C. 154(b) by 1476 days.

(21) Appl. No.: 10/549,091

(22) PCT Filed: Feb. 5, 2004

(86) PCT No.: PCT/EP2004/001038
§ 371 (c)(1),
(2), (4) Date: Nov. 1, 2005

(87) PCT Pub. No.: WO2004/081830
PCT Pub. Date: Sep. 23, 2004

(65) Prior Publication Data
US 2007/0016482 A1    Jan. 18, 2007

(30) Foreign Application Priority Data

Mar. 13, 2003    (DE) .................................. 103 10 911

(51) Int. Cl.
*G06Q 30/00*    (2006.01)
*G06Q 40/00*    (2006.01)

(52) U.S. Cl. ................... 705/26.3; 705/26.1; 705/26.35; 705/26.41; 705/37

(58) Field of Classification Search .................... 705/34, 705/26.1–27.2, 37
See application file for complete search history.

(56) References Cited

U.S. PATENT DOCUMENTS 5,835,896 A * 11/1998 Fisher et al. ..................... 705/37
6,012,045 A * 1/2000 Barzilai et al. .................. 705/37
6,041,308 A * 3/2000 Walker et al. ................ 705/14.1
(Continued)

FOREIGN PATENT DOCUMENTS

JP            9-171531         6/1997
(Continued)

OTHER PUBLICATIONS

Translation of International Preliminary Report on Patentability in PCT/EP2004/001038 (Jul. 2005).
(Continued)

*Primary Examiner* — Ig T An
(74) *Attorney, Agent, or Firm* — Collard & Roe, P.C.

(57) ABSTRACT

The invention relates to an electronic data processing system for conducting auctions over a data network. A component of the system consists of an auction server, which is connected to the data network and which has an auction database for managing auction data records containing product description data and bid data. A number of bidder terminals are connected to the data network and comprise appropriate means for retrieving data from the auction database and comprise means for transmitting bid data to the auction server. The aim of the invention is to enable the effective and economical use of conventional internet auction platforms by product manufacturers and retailers in order to sell goods. To this end, the invention provides that the electronic data processing system is supplemented by a retailer server, which is connected to the data network, and by an intermediary server that is also connected to the data network. The intermediary server has a program controller with which auction data records are automatically put into the auction database according to production description data that are extracted by the intermediary server from corresponding product portfolio data records of the retailer server. The intermediary server uses its program controller to automatically create order data records for the auction data records.

11 Claims, 1 Drawing Sheet

U.S. PATENT DOCUMENTS

| | | | |
|---|---|---|---|
| 6,044,363 A * | 3/2000 | Mori et al. | 705/37 |
| 6,064,981 A * | 5/2000 | Barni et al. | 705/26.3 |
| 6,085,169 A * | 7/2000 | Walker et al. | 705/4 |
| 6,151,589 A * | 11/2000 | Aggarwal et al. | 705/36 R |
| 6,196,458 B1 * | 3/2001 | Walker et al. | 235/380 |
| 6,199,050 B1 * | 3/2001 | Alaia et al. | 705/37 |
| 6,415,270 B1 * | 7/2002 | Rackson et al. | 705/36 R |
| 6,677,858 B1 * | 1/2004 | Faris et al. | 340/573.1 |
| 6,847,939 B1 * | 1/2005 | Shemesh | 705/26.3 |
| 6,925,446 B2 * | 8/2005 | Watanabe | 705/26.3 |
| 6,976,005 B1 * | 12/2005 | Bansal et al. | 705/26.3 |
| 7,328,185 B1 * | 2/2008 | Gupta et al. | 705/37 |
| 2001/0029479 A1 * | 10/2001 | Watanabe | 705/37 |
| 2001/0034663 A1 * | 10/2001 | Teveler et al. | 705/26 |
| 2001/0053995 A1 | 12/2001 | Nishimoto | |
| 2002/0023039 A1 * | 2/2002 | Fritsch et al. | 705/37 |
| 2002/0069378 A1 | 6/2002 | McLellan et al. | |
| 2002/0083003 A1 * | 6/2002 | Halliday et al. | 705/52 |
| 2002/0143584 A1 * | 10/2002 | Lundegren | 705/4 |
| 2002/0165817 A1 * | 11/2002 | Rackson et al. | 705/37 |
| 2004/0054551 A1 * | 3/2004 | Ausubel et al. | 705/1 |
| 2004/0083160 A1 * | 4/2004 | Byde et al. | 705/37 |

FOREIGN PATENT DOCUMENTS

| | | |
|---|---|---|
| JP | 9171531 A | 6/1997 |
| WO | WO 00/65505 | 11/2000 |
| WO | WO 00/65505 A | 11/2000 |
| WO | WO 00/70515 | 11/2000 |
| WO | WO 01/33313 | 5/2001 |
| WO | WO 0133313 A | 5/2001 |

OTHER PUBLICATIONS

International Search Report, Dated Sep. 5, 2005.

* cited by examiner

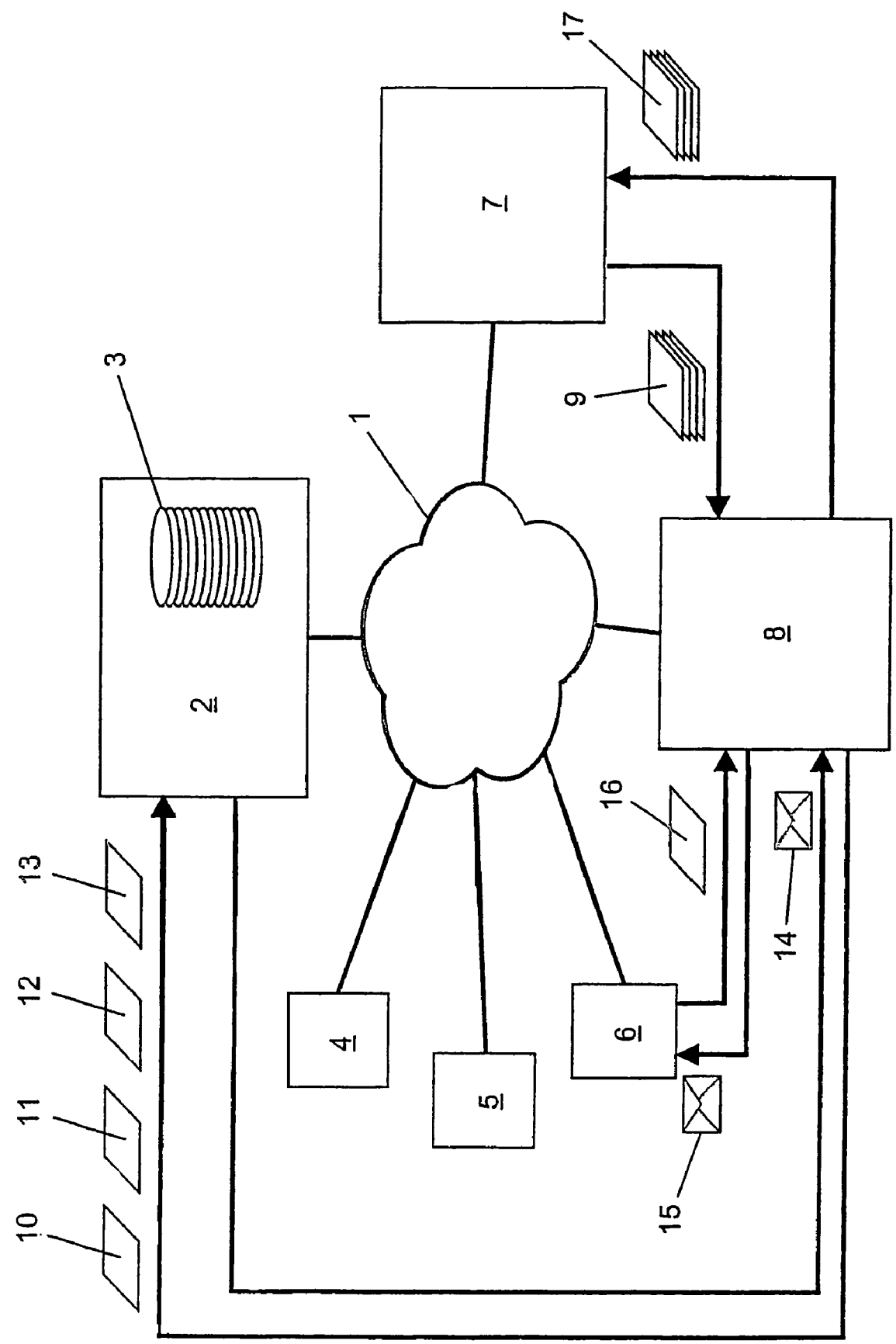

ELECTRONIC DATA PROCESSING SYSTEM FOR INTERNET AUCTIONS

CROSS REFERENCE TO RELATED APPLICATIONS

Applicant claims priority under 35 U.S.C. §119 of German Application No. 10310911.0 filed Mar. 13, 2003. Applicant also claims priority under 35 U.S.C. §365 of PCT/EP2004/001038 filed Feb. 5, 2004. The international application under PCT article 21(2) was not published in English.

The invention relates to an EDP system for automatically conducting
auctions by way of a data network, having
  a) an auction server connected with the data network, which has an auction database for managing auction data records comprising product description data and bid data, and which furthermore has an auction program controller by means of which the bid data are evaluated and auction winners are determined from them, and having
  b) a plurality of bidder terminals also connected with the data network, which have means for retrieving data from the auction database of the auction server, and means for transmitting bid data to the auction server.

Furthermore, the invention relates to a method for computer-supported implementation of an auction by way of a data network, using such an EDP system, as well as to a computer program for implementing this method.

For example, an EDP system for conducting an online auction on the Internet is known from U.S. Pat. No. 5,835,896. The method described in this reference corresponds to the pattern that is usual for the online auctions (e.g. e-bay, Converge, Amazon) that are generally known today:

An auction server connected with the Internet accesses an auction database in which product data, bid data, and customer data of the registered users of the auction platform are stored. By means of a suitable program controller of the auction server, the bid data that are received by way of the Internet are automatically evaluated, whereby an auction winner is automatically determined for every auction, in accordance with the highest bid that is offered. The auction winner as well as the bidder of the auctioned product, in each instance, are in turn automatically informed of the result of the auction, for example by email.

While originally such online auctions were primarily used by private individuals for selling used goods, in most instances, the more well-known Internet auction platforms now enjoy increasing popularity among retailers and product manufacturers, as well, who use Internet auction platforms for marketing many different products. Using online auctions, businesses have the opportunity of offering their products to a large group of private and also commercial potential customers.

With regard to use by commercial vendors, the online auctions known at present have a number of disadvantages. For product manufacturers who wish to sell goods of the same kind in large numbers, it is a disadvantage that an individual auction must be set up for each product unit, in the case of an Internet auction platform, and that after the auction has been completed, in each instance, the payment handling and the shipping has to be carried out individually for every auction winner. Because of the great amount of effort involved, the related costs are too high for most product manufacturers. The modalities described, according to which handling of the auctions takes place in the case of the Internet auction platforms known at this time, therefore have the result that utilization of these platforms is often not attractive for commercial vendors, for economic reasons.

The present invention is based on the task of making Internet auctions usable also for commercial vendors, whereby it is supposed to be possible for such vendors to sell a large number of products within a short period of time, at the lowest possible cost.

This task is accomplished by the invention, proceeding from an EDP system of the type stated initially, in that an intermediary server is connected with the data network, whereby the intermediary server has a program controller by means of which
  product description data are extracted from product portfolio data records received from a retailer server by way of the data network,
  auction data records are put into the auction database of the auction server, in accordance with the extracted product description data, by way of the data network, and
  order data records, which comprise the customer data assigned to the auction winners, are generated for the auction data records.

According to the invention, a product manufacturer or retailer has the possibility of transmitting product portfolio data records to the intermediary server by means of the retailer server. The product portfolio data records contain a listing of the products that the product manufacturer or retailer wishes to sell by way of online auctions. Furthermore, product description data are contained in the product portfolio data records, for every product, by means of which the potential customers are supposed to receive sufficient information about the product in question.

The intermediary server has a program controller by means of which the product description data are extracted from the product portfolio data for each individual product. The intermediary server then makes contact with the auction server directly, by way of the data network, and sets up auctions in the auction database of the auction server, for each individual product, in accordance with the product description data extracted. For this purpose, the intermediary server preferably utilizes the data interface that is made available by the auction server. This data interface usually consists of a Web interface that can be used interactively by any registered users of the auction server, by way of the Internet.

As soon as the individual auction data records have been put into the auction database of the auction server by the intermediary server, the auction server automatically conducts the online auctions, whereby bid data, in particular, are accepted from bidder terminals and stored. Finally, the auction server determines an auction winner for each individual auction from the bid data. After completion of the auction, the intermediary server generates order data records in which the customer data assigned to the auction winners, in each instance, are stored.

By means of the system according to the invention, the product manufacturer or retailer is completely uncoupled from the actual handling of the auctions for the individual products. As the vendor, the product manufacturer or retailer merely has to present a list of the products to be sold, in the form of product portfolio records. After completion of the individual auctions, the vendor has the order data sets generated by the intermediary server available, without the vendor himself having to determine the customer data of each individual auction winner.

The intermediary server, equipped with a suitable program controller, therefore makes it possible for the product manufacturer or retailer to sell a large number of products by way of online auctions, at the same time, with the smallest possible effort. It is advantageous if the vendor, as the product manufacturer or retailer, is not involved in the set-up and handling of the individual auctions at all, according to the invention.

A practical further development of the EDP system according to the invention consists in the fact that the intermediary server has a customer database for managing the customer data, whereby the customer data of the auction winners, in each instance, can be input into the customer database by means of an input interface of the intermediary server from the bidder terminals, by way of the data network. As a result, recording and managing the customer data required by the product manufacturer or retailer, in each instance, becomes particularly effective. Since the intermediary server is connected to the data network (Internet), according to the invention, to which the bidder terminals are also connected, the auction winners, in each instance, can easily access the input interface of the intermediary server. In this connection, it is practical if the input interface is configured in such a manner, for example in the form of a suitable input screen, that the auction winners are asked for all of the data required by the product manufacturer or retailer. The data input by the auction winners, in each instance, are then stored and managed by means of the customer database of the intermediary server. The stored data can then be utilized for automatically generating the order data sets for the individual auction data sets, by means of the program controller.

Usually, after an individual auction has been completed, the vendor of the goods in question as well as the auction winner, in each instance, are informed by the auction server, by means of automatically generated email messages. Since, according to the invention, the intermediary server appears as the vendor, from the point of view of the auction server, the intermediary server receives such a message from the auction server. It is practical if the program controller of the intermediary server automatically extracts the email address of the auction winner in question from the email message. Afterwards, the intermediary server, in turn, generates an email message directed at the auction winner, with which the auction winner is asked to input his customer data, by way of the Internet, using the input interface of the intermediary server, as described above. Accordingly, the acquisition of the customer data can advantageously proceed completely automatically.

It is practical if the automatic generation of the order data records and the transmission of same to the retailer server take place as a function of the registration of payment procedures that correspond to the bids of the auction winners, in each instance. In order to relieve the product manufacturer or retailer of the burden of handling the individual auction, to the greatest possible extent, it is advantageous if the payments received from the auction winners, in each instance, are also monitored by the program controller of the intermediary server. The order data records intended for the product manufacturer or retailer are accordingly generated only after the incoming payment has been registered by the intermediary server.

A particularly practical further development of the EDP system according to the invention consists in the fact that minimum bid data assigned to the product description data are calculated from the product portfolio data records by means of the program controller of the intermediary server, which minimum bid data are attached to the auction data records, in each instance. Most Internet auction platforms permit a minimum bid to be set by the vendor for every product that is offered. This makes it possible to ensure that a price corresponding to the minimum bid is achieved for the product being offered, in any case, under the assumption that the auction server actually receives a bid in the desired amount. The system according to the invention makes it possible for the product manufacturer or retailer to merely set a total amount that is to be achieved with the sale of the goods listed in the corresponding product portfolio data record, as a whole. The program controller of the intermediary server then automatically calculates minimum bid data from this information, for the individual goods to be offered for sale, and these minimum bid data are taken into consideration when setting up the auction data records on the auction server. The calculation of the minimum bid data can take place according to a key that can be predetermined, so that particular purchasing incentives are created for certain goods, for example.

The EDP system according to the invention as described above is suitable for a method for computer-supported implementation of an auction by way of a data network, having the method steps a) generating auction data records comprising product description data, in an auction database of an auction server connected with the data network, b) transmitting data from the auction database to a plurality of bidder terminals connected with the data network, c) registering and storing bids that are received from the bidder terminals, by way of the data network, in the auction database, d) automatically evaluating bid data and determining auction winners for each auction data record.

Proceeding from such a method, the task on which the invention is based, as described above, is accomplished in that in order to generate the auction data records in method step a), a product portfolio data record is transmitted by a retailer server connected with the data network, to an intermediary server also connected with the data network, whereby the intermediary server automatically i) extracts product description data from the product portfolio data record, ii) puts the auction data records into the auction database of the auction server, by way of the data network, in accordance with the extracted product description data, iii) after a determination of the auction winners in method step d), generates order data records with the customer data assigned to the auction winners, and transmits them to the retailer server, by way of the data network.

The method steps i)-iii) automatically performed by the intermediary server, according to the invention, are implemented by means of a suitable program controller of the intermediary server. Such a program controller can be made available for implementation on a computer provided as the intermediary server, in the form of a computer program stored on a suitable data carrier (magnetic tape, diskette, CD/DVD-ROM).

An exemplary embodiment of the invention will be explained below, using the drawing:

The drawing schematically shows an EDP system according to the invention in the form of a block schematic. An integral part of the system is an auction server 2 connected with a data network 1 (Internet), which has an auction database 3, which serves for managing auction data records comprising product description data and bid data. Furthermore, a number of bidder terminals 4, 5, 6 are connected with the data network 1. These are conventional personal computers that have access to the Internet by way of a modem, for example. In this connection, suitable software programs (so-called "browsers") are installed on the bidder terminals 4, 5 and 6, which can be utilized to access data from the auction database 3 of the auction server 2, by way of the data network 1. The browser programs can, at the same time, be used for transmitting bid data from the bidder terminals 4, 5, 6 to the auction server 2. Usual Internet technology, as it is used in the known Internet auction platforms, can be used for interactive communication between the bidder terminals 4, 5 and 6 and the auction server 2. As shown in the drawing, a retailer server 7 is furthermore connected with the data network 1. The retailer server 7 is a suitable personal computer of a product manufacturer or retailer. According to the invention, an intermediary server 8 is furthermore provided in the EDP system shown, which also has a connection to the data network 1.

The intermediary server 8 has a program controller by means of which the communication between intermediary server 8, retailer server 7, bidder terminal 6, and auction server 2 is controlled, as symbolized in the drawing by arrows.

According to the invention, the method for computer-supported implementation of an auction by way of the data network 1 proceeds as follows:

First, a product portfolio data record 9 is transmitted to the intermediary server by the retailer server 7, by way of the data network 1. The intermediary server 8 extracts product description data for various goods that the product manufacturer or retailer to whom the retailer server 7 is assigned wishes to sell by way of Internet auctions from the product portfolio data record; this is not shown in detail in the drawing. The product description data are then transmitted to the auction server 2 as auction data records 10, 11, 12 and 13, by the intermediary server 8, by way of the data network 1, and stored there in the auction database 3. The auction data records 10, 11, 12 and 13 can then be accessed by way of the data network 1, in the manner known for the known Internet auction platforms. In this connection, the data are transmitted from the auction database 3 to the corresponding bidder terminals 4, 5 and 6 upon request, by means of suitable Internet technology. Bids relating to the individual auction data records 10, 11, 12 and 13 are given by the users of the bidder terminals 4, 5 and 6, received in the form of bid data on the auction server 2 by way of the data network 1, and stored in the auction database 3. The bid data 3 are automatically evaluated by means of the program controller of the auction server 2, in usual manner, whereby an auction winner is determined for each auction data record 10, 11, 12 and 13, in each instance. After completion of an auction, the auction server 2 automatically generates an email message 14, which is transmitted to the intermediary server 8 by way of the data network 1. The intermediary server 8 appears as the vendor of the goods in question, from the point of view of the auction server 2, and is informed, in the email message 14, as to who won the auction in question and what highest bid was successful. By means of the program controller of the intermediary server 8, the email address of the auction winner is extracted from the email message 14, among other things, and stored in a customer database of the intermediary server 8. The email address of the auction winner is furthermore used to generate an email message 15, again automatically, which is transmitted to the bidder terminal 6 assigned to the auction winner in question, by way of the data network 1. In the email message 15, the auction winner is requested to enter his data (name, delivery address, billing address, phone number, fax number, etc.), by way of an input interface of the intermediary server 8 intended for this purpose. After the auction winners are determined, and after the related customer data 16 have been recorded, the intermediary server 8 generates an order data record 17 that is transmitted to the retailer server 7 by way of the data network 1. The order data record 17 contains the data stored in the customer database of the intermediary server 8, with regard to the individual auction winners who have won the bidding for the goods listed in the original product portfolio data record 9. The product manufacturer or retailer can derive the corresponding names, delivery addresses, and billing addresses of the customers from the order data record 17, and have the goods shipped to the customer in question.

The invention claimed is:

1. EDP system for automatically conducting auctions by way of a data network (1), comprising
    a) an auction server (2) connected with the data network (1), which has an auction database (3) for managing auction data records comprising product description data and bid data, and which furthermore has an auction program controller by means of which the bid data are evaluated and auction winners are determined from them,
    b) a plurality of bidder terminals (4, 5, 6) also connected with the data network (1), which have means for retrieving data from the auction database (3) of the auction server (2), and means for transmitting bid data to the auction server (2),
    c) a retailer server (7) connected with the data network (1),
    d) an intermediary server (8) also connected with the data network (1), whereby the intermediary server (8) has a program controller by means of which
       product description data are extracted from product portfolio data records (9) received from the retailer server (7) by way of the data network (1),
       auction data records (10, 11, 12, 13) are put into the auction database (3) of the auction server (2), in accordance with the extracted product description data, by way of the data network (1), and
       order data records (17), which comprise the customer data assigned to the auction winners, are generated for the auction data records (10, 11, 12, 13).

2. EDP system according to claim 1, wherein the intermediary server (8) has a customer database for managing the customer data, whereby the customer data of the auction winners, in each instance, can be input into the customer database by means of an input interface of the intermediary server (8) from the bidder terminals (4, 5, 6), by way of the data network (1).

3. EDP system according to claim 1, wherein the generation of the order data records (17) and the transmission of same to the retailer server (7) take place as a function of the registration of payment procedures that correspond to the bids of the auction winners, in each instance.

4. EDP system according to claim 1, wherein minimum bid data assigned to the product description data are calculated from the product portfolio data records (9) by means of the program controller of the intermediary server (8), which minimum bid data are attached to the auction data records (10, 11, 12, 13), in each instance.

5. Method for computer-supported implementation of an auction by way of a data network (1), having the method steps:
    a) generating auction data records (10, 11, 12, 13) comprising product description data, in an auction database (3) of an auction server (2) connected with the data network (1),
    b) transmitting data from the auction database (3) to a plurality of bidder terminals (4, 5, 6) connected with the data network (1),
    c) registering and storing bids that are received from the bidder terminals (4, 5, 6), by way of the data network (1), in the auction database (3), d) automatically evaluating bid data and determining auction winners for each auction data record (10, 11, 12, 13), wherein in order to generate the auction data records 10, 11, 12, 13) in method step a), a product portfolio data record (9) is transmitted by a retailer server (7) connected with the data network (1), to an intermediary server (8) also connected with the data network (1), whereby the intermediary server (8) automatically i) extracts product description data from the product portfolio data record (9), ii) puts the auction data records (10, 11, 12, 13) into the auction database (3) of the auction server (2), by way of the data network (1), in accordance with the extracted product description data, and iii) after a determination of the auction winners in method step d), generates order data records (17) with the customer data (16) assigned to the auction winners, and transmits them to the retailer server (7), by way of the data network (1).

6. Method according to claim 5, wherein after determination of the auction winners in method step d), the auction server (2) automatically generates and transmits email messages to the bidder terminals (4, 5, 6) of the auction winners in question, and to the intermediary server (8), by way of the data network (1), whereby the intermediary server (8) extracts the email addresses of the auction winners from the email messages (14) directed to it, and stores them in a customer database.

7. Method according to claim 5, wherein before generation of the order data records (17), the customer data (16) are input into the customer database of the intermediary server (8) by the auction winners, in each instance, by means of an input interface made available by means of the intermediary server (8), by way of the data network (1).

8. Method according to claim 6, wherein the auction winners are automatically requested to input their customer data (16) by way of the input interface of the intermediary server (8), by the intermediary server (8), by way of an email message (15).

9. Method according to claim 5, wherein the transmission of the order data records (17) to the retailer server (7) takes place as a function of the registration of payment procedures that correspond to the bids of the auction winners, in each instance.

10. Method according to claim 5, wherein minimum bid data assigned to the product description data are calculated from the product portfolio data records (9) by means of the program controller of the intermediary server (8), which minimum bid data are attached to the auction data records (10, 11, 12, 13), in each instance.

11. Computer program for automatically implementing auctions by way of a data network (1), wherein a method according to claim 5 is implemented on a computer being used as an intermediary server (8) and connected with the data network (1).

* * * * *